United States Patent Office 2,975,991
Patented Mar. 21, 1961

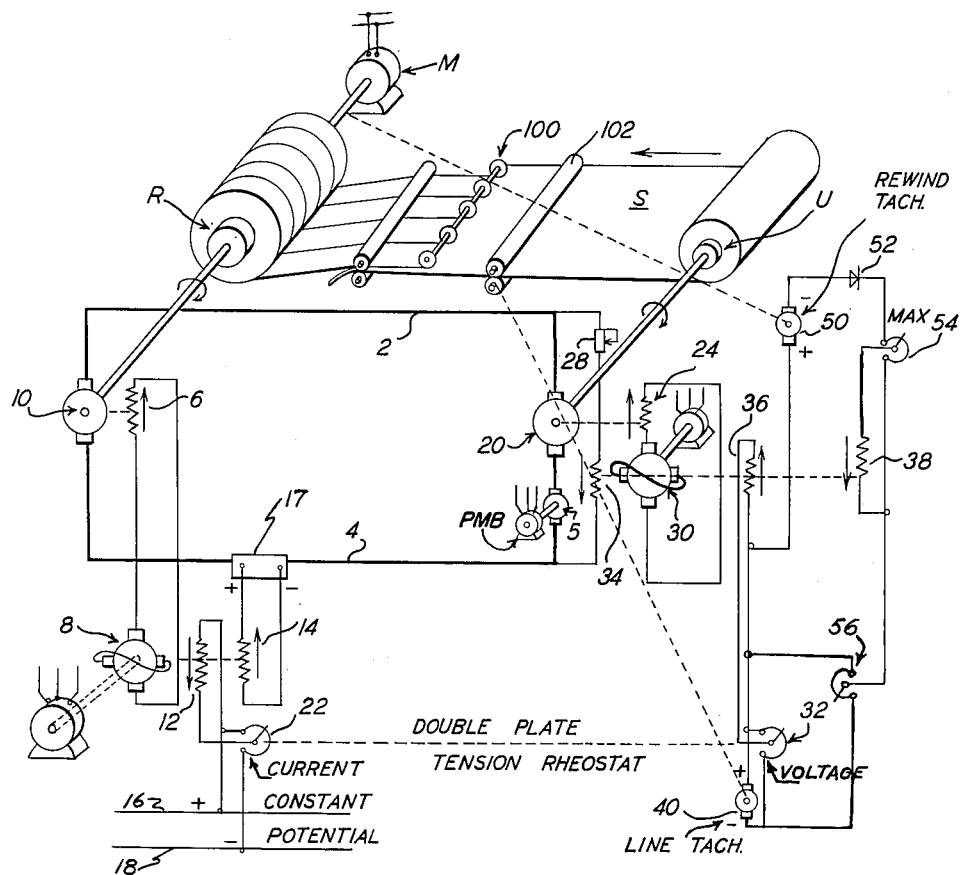

2,975,991
STRIP TENSION CONTROLLER

Mathias Michel, Walnut Creek, Calif., assignor to Kaiser Aluminum & Chemical Corporation, Oakland, Calif., a corporation of Delaware Filed Dec. 30, 1957, Ser. No. 705,909

9 Claims. (Cl. 242—75.51)

This invention relates to control systems for maintaining tension in a web or strip being unwound and fed to a strip processing machine such as a rolling mill, slitter, trimmer or the like. The term strip or web is meant to include any material wide or narrow that is usually processed in a continuous operation passing from an unwinding reel to a processing machine such as referred to above and subsequently rewound on a rewinding reel or mandrel.

More particularly, the invention relates to control systems for maintaining strip tension through a feed back motor-drag generator system wherein the degree of tension or pull on the strip may be varied at will by the operator through manually operated control devices or automatically as a function of rewind reel build up.

Various schemes have been devised to control tension in a strip processing line among which are mechanical, electro-mechanical, or completely electrical systems. Mechanical and electromechanical systems, while operative to perform their function, are subject to disadvantages such as time lags, etc., while requiring constant maintenance. Gradually, industry has come to rely more and more upon all electrical control systems.

While many electrical control systems for maintaining constant strip tension are well known in the art, such systems as a rule are limited in their range of sensitivity. The accepted range in the industry is a ratio of 10:1 between the maximum tension and minimum tension that can be maintained on a strip without an excessive change in tension on the lower end of the range under all speed conditions and from a maximum ratio of empty reel to full coil diameter.

It will be shown that the present invention has for one objective a system which will provide a sensitivity of 100:1 between maximum and minimum tensions.

A further object of the invention is to make feasible the use of smaller drag generators and smaller feed back motors whenever maximum tensions are not required over the entire speed range of the system.

Another object of the invention is to produce a strip tension control system wherein the tension in a strip may be selected at a given value and will be subsequently reduced as the winding process continues thus assuring proper coiling of the processed strip upon the rewind reel or mandrel.

A further object of the invention is to produce a reliable efficient tension control system in which the components are utilized at all times to their best advantage.

In the conventional tension control systems the horsepower required to maintain strip tension is strictly a function of the maximum tension required and the maximum speed, regardless of whether the maximum tension is needed at the maximum speed. The proposed system contemplates that the size of the electrical machines used therein can be reduced to 50% of the size heretofore believed necessary and wherein the maximum tension may be developed from half speed through the maximum speed of the line.

The mentioned and other objects of the invention, not specifically referred to, may be realized by coupling together in an armature loop system, a feedback motor and a drag generator having speed ranges by field control in excess of the ratio between the empty mandrel and the full coil diameters and by controlling the voltage and the current in this loop circuit through suitable voltage and current regulators, the voltage control using as a reference the voltage output from a tachometer generator which is driven at strip speed and therefore has a voltage output proportional to strip speed and acting upon the excitation of the drag generator in a conventional manner to maintain a voltage proportional to strip speed, regardless of the speed of the drag generator which changes with a changing coil diameter, a conventional regulator being able to maintain accurate voltage over a range of 10:1 from maximum to minimum voltage to be maintained on this generator. Further, a current regulator of a conventional type is used to maintain a constant current in the loop circuit by controlling the voltage of a feedback motor which is opposed to the voltage of the drag generator, the accepted operating range of this regulator being also 10:1. It will also be seen that, with 10% voltage and 10% current maintained in the loop circuit, the power of the drag generator equals 1% of the maximum power available since the power is a product of current and voltage. Since the tension in the strip is proportional to the power developed by the drag generator, the tension range available is 100:1 as compared to 10:1 range in the currently used strip tension control systems. In addition, means are included in the system whereby the tension in the strip may be progressively decreased as the diameter of the rewind coil increases and the point at which this decrease takes place may be selected.

In considering the detailed description of the invention to follow, reference will be made to the drawing attached to and forming a part of the present specification wherein The figure of the drawing is a diagram of a simplified control system utilizing the principles of the invention, as applied to a processing line.

In the figure of the drawing there is shown a schematic or diagrammatical processing line for strip. The particular process shown is that of slitting and trimming a continuously moving strip of sheet metal, such as for example aluminum foil or sheet. The sheet S is unwound from unwind reel U, passed through the slitting and trimming apparatus 100 and then is rewound upon a rewind reel R.

The control system and driving source for the processing line includes an externally excited dynamoelectric machine or feedback motor 10 and an externally excited dynamoelectric machine or drag generator 20. The armatures of the two are connected together in a loop circuit as indicated by the heavy lines 2 and 4. Preferably, a booster generator 5 of the self-excited type and having its own prime mover PMB has its armature connected into the loop circuit. The booster generator 5 is preferably operated at a constant speed and tends to cause both feedback motor 10 and drag generator 20 to operate as motors in opposition to one another at stall conditions of the line to maintain tension on the strip when the strip S is not moving. During stalled tension conditions a brake, not shown, is set on the shaft of rewind motor M to keep the rewind reel R from rotating. The current in the armature of drag generator 20 in combination with the field flux of this generator sets up a torque which puts the strip S between the unwind reel U and the rewind reel R under tension. The booster generator 5 is preferably controlled in such a manner from a tension adjusting rheostat, not shown, that its voltage is proportional to the tension setting of the strip. This rheostat, not shown, along with the field of the booster generator 5 can be electrically connected between the constant potential lines 16 and 18 in a manner well-known in the art. By so doing, a stalled tension is maintained which is equal or proportional to the running tension. The booster generator 5 also serves when the strip is running to compensate for IR drop in the circuit in a well known manner.

The feedback motor 10 is connected by direct mechanical connection to a rewind mandrel or reel R by suitable shaft type of connection while the drag generator 20 is connected to an unwind mandrel U also by direct mechanical connection as is conventional. Since it is obvious that additional power is required in the winding operation, the rewind mandrel R is usually connected to a further motor M which may be an alternating current or direct current motor. In this case the latter serves to supply the necessary power over and above that put in by feedback motor 10 to the rewind mandrel R all as is conventional in the art.

The field 6 of feedback motor 10 is connected to an amplidyne current regulator 8. This type of regulator is well known in the art and may briefly be described as a driven dynamoelectric machine whose output may be controlled through the medium of a reference winding 12 and counteracting signal winding 14. In other words, the regulator 8 is a comparative regulator comparing the flux of two windings and having an output of a value proportional to the differential flux obtained between the reference value and a received signal value.

The reference winding 12 of the regulator 8 is connected to a source of constant potential as indicated by lines 16 and 18 and preferably a rheostat 22 is incorporated between the reference field winding 12 and the constant potential source such that the amperage supplied to the reference winding 12 may be selected at a desired value.

The signal winding 14 of the dynamoelectric regulator 8 is connected into the loop circuit. A shunt 17 in the loop circuit causes current flow through the signal winding 14. Since the two windings buck one another, i.e., current flow in winding 12 is opposite to that in winding 14, a comparative result is obtained which, as the signal winding current varies, causes the current produced and delivered to the field winding of feedback motor 10 to vary. The ultimate result obtained is that the flux developed in the field winding of feedback motor 10 is increased or decreased. Thus, the regulator 8 serves to weaken or strengthen the field of rewind motor 10 supplying thereto a constant current or excitation which is a direct function of the selected position of rheostat 22.

Referring again to the feedback motor 10, it will be seen that the function of regulator 8 is to provide constant current in the loop circuit 2, 4 by adjusting the counter E.M.F. of the feedback motor 10 through its shunt field excitation, the value of the current being directly proportional to the setting of current control rheostat 22 and thus, the horsepower developed by rewind motor 10, becomes a function of the potential supplied by drag generator 20.

Considering now drag generator 20, it will be seen that the externally excited field winding 24 of this separately excited dynamoelectric machine is under the control of an amplidyne voltage regulator 30, which as will be described, regulates the armature voltage developed by generator 20 such that this voltage is proportional to strip speed. The magnitude of the voltage developed is controlled by rheostat 32 as will be apparent as the description proceeds.

It will be noted that rheostats 22 and 32 have been indicated as separate rheostats. In practice, however, the two are usually combined as separate stacks in a common housing, interconnected by a common shaft and operated as one unit. This arrangement is indicated by the dotted line interconnecting the two units as shown in Figure 1.

Again considering drag generator 20, it will be apparent that because of the direct interconnection between the unwind reel U and the armature of drag generator 20 will revolve at an r.p.m. equal to the r.p.m. of unwind reel U. Thus, if the field flux of this generator were maintained constant, the voltage produced would increase in direct proportion to an increase in the speed of unwind reel U. However, the degree of excitation of field 24 is lessened under the controlled action of amplidyne 30 when the r.p.m. of the drag generator 20 increases due to a decreasing coil diameter, for a given strip speed. The action of amplidyne 30 is such as to maintain a loop voltage which is proportional to strip speed regardless of the r.p.m. of the rewind reel motor R or the r.p.m. of the unwind reel drag generator U. As has been indicated, the control of the potential developed by drag generator 20 is determined by the action of amplidyne 30 which controls the strength of the generator field 24. This dynamoelectric regulator is similar to regulator 8 in operation but differs therefrom in that its output to field winding 24 is the result of the comparative effect of three regulator control windings 34, 36 and 38. Control field 36 is connected across a signal circuit including a tachometer generator 40 through voltage selection rheostat 32. Control winding 34 is connected across the armature loop circuit 2 and 4 along with an adjustably fixed rheostat 28. Winding 34 is also in opposition to control field 36. Control field 38 is connected in such a manner that its excitation depends on the relative speeds of line tachometer generator 40 and rewind motor tachometer generator 50. As long as rewind tachometer generator voltage 50 is greater than the line tachometer voltage 40, the current in control field 38 is zero since the blocking rectifier 52 opposes the current flow which would be due to the rewind reel tachometer generator 50 which operates in opposition to the voltage of the line tachometer generator 40. As the relative r.p.m. of the rewind reel motor 10 decreases for a given strip speed due to an increasing coil diameter, the voltage relation between line tachometer generator 40 and rewind reel tachometer generator 50 changes gradually until the voltage developed by line tachometer 40 is greater than that developed by the rewind tachometer generator 50. At that time, current begins to flow in winding 38 of the amplidyne regulator 30. As a result of this current flow which is in opposition to the current flow in winding 36, the loop voltage, which is maintained by regulator 30, will be decreased. This results in a decreased strip tension since the power of the drag generator 20 is decreased proportionally to this voltage. The amount of decrease in tension depends on the setting of adjusting of taper tension adjusting rheostat 54, as will be more apparent as the description proceeds.

From an inspection of the figure of the drawing, it will be seen that tachometer generator 40, which may be of conventional type, is connected to the process line in such a manner as to produce a voltage or signal that is directly proportional to the speed of the strip S. As illustrated, this tachometer generator 40 is connected by direct mechanical connection to one of the sheet engaging rolls 102 of the slitter 100.

The tachometer generator 50 is similar to tachometer generator 40 and is connected by direct mechanical connection to the rewind reel R as indicated such that it will develop a potential or signal which is directly proportional to the speed of the rewind reel R. It will be noted that these two signal generators excite their respective control windings such that they buck one another.

Considering now the function of amplidyne regulator 30 and its control windings 34, 36 and 38, respectively, it will be seen that control winding 34 is directly connected into the armature loop circuit including the feedback motor 10 and drag generator 20. This winding 34 then develops a flux intensity that is directly proportional to the potential developed by drag generator 20 and is a function of its r.p.m. It will be noted as indicated above, that interposed in this control winding circuit there is an adjustably fixed resistor 28 which limits the maximum current in control winding 34 at the maximum loop voltage.

Control winding 36 is connected through voltage control rheostat 32 to strip speed tachometer generator 40 in such a manner that this speed generator develops a potential or signal in winding 36 which bucks or is of opposite polarity to that of control winding 34.

Control winding 38 is connected through tapered tension rheostat 54 to the tachometer generator 50 which is directly connected to rewind reel R. Thus, the output of this signal generator 50 and hence, of control winding 38 would be a direct function of the r.p.m. of the rewind reel R. However, due to the presence of rheostat 54 between rewind mandrel tachometer generator 50 and control winding 38 of amplidyne regulator 30, the flux developed in the control winding 38 may be modified by movement of rheostat 54 as and for a purpose as will be apparent.

In considering the manner in which the regulator 30 functions to control the tension in strip S, momentary consideration must be given to the operation of the rewind and unwind reels R and U. It will be seen that when the line starts (after the leading edge strip is fixed to rewind mandrel R) the speed (r.p.m.) of the unwind reel U is relatively slow, because of the large diameter of the unwound coil on this reel. Since the rewind mandrel R will tend to rotate at a constant r.p.m. the speed of the strip S in feet per minute will be relatively slow. As the process continues, however, these conditions reverse as the coil builds up on rewind mandrel R and builds down on unwind mandrel U. It will also be seen that the torque and also the horsepower requirements of reel R continuously goes up as the coil builds up. Accordingly, the supply of power from drag generator 20 must go up otherwise the load on the constant speed D.C. motor M could increase to the point where this motor could readily be overloaded and would burn up. However, if the tension in the strip were reduced, it may be seen that the motor M will not be overloaded. Since as has been pointed out a decrease in tension in strip S is most desirable, the present invention contemplates that the tension in the strip will be reduced after a certain build up on rewind mandrel R.

The desired result is accomplished through control windings 34, 36 and 38. At the start, the flux developed in the control winding 34 is small due to the fact that potential developed by the drag generator is small due to the low speed of the strip. Similarly, the signal from tachometer generator 40 is small due to the fact that the strip speed is low since the coil on reel R is of a minimum diameter. However, the voltage of rewind tachometer generator 50 is large due to the fact that the relative r.p.m. of the rewind reel motor U is high as long as the rewind coil diameter is small. The voltage output of tachometer generator 50 is at that time greater than the voltage output of line tachometer generator 40 and would tend to circulate a current through control winding 38. However, current in this direction is blocked off by blocking rectifier 52 and no current flow takes place in control winding 38.

As a coil builds up on rewind reel R, however, the strip speed increases since the rewind reel motor R operates at a constant r.p.m. and consequently the voltage of line tachometer generator 40 increases until it is equal and finally surpasses the voltage of rewind tachometer generator 50. At that time, current begins to circulate from line tachometer generator 40 through rewind tachometer generator 50 and the control winding 38. Since this winding 38 is in opposition to the reference winding 36, a decrease in the loop voltage will be the result with a corresponding decrease in strip tension and power requirements in the loop circuit. The amount of decrease in tension for a given differential in the voltages between line tachometer 40 and rewind tachometer 50 depends on the tension setting of adjusting rheostat 54. For a zero setting of this rheostat no decrease in tension will occur and constant tension is maintained on the strip S throughout the entire operation. However, as the rheostat 54 is adjusted at any position between zero and maximum, it will control the current which flows through control winding 38. Thus, a setting of this rheostat at any position above zero will determine the voltage at which current will flow through the control winding 38. Thus, the tension on the strip S may be varied, within the limits of the equipment. Thus, by controlling the winding 38 the pull on the strip may be varied and the selected value will be maintained throughout the entire rewind of the strip on rewind reel R.

Oftentimes, it is desirable, however, to rewind the processed material in such a manner that the tension which is maintained on the strip S is tapered, i.e., is progressively reduced as the coil diameter increases on the rewind reel R. This is done to prevent the inner turns of the coil from slipping against each other or to prevent collapse of the inner turns of the coil when it is removed from the mandrel R.

In order to accomplish this type of tension control, a further rheostat 56 is interposed in the circuit of control winding 38. This rheostat acts to limit the amperage flow through this winding 38. Thus, since the current passing through winding 38 would become limited while the current in winding 36 continues to increase, it will be seen that the voltage in the loop circuit will gradually decrease once the point at which the effect of winding 38 on regulator 30 reaches the constant value. Since the voltage is reduced as the differential between control windings 36 and 38 becomes greater, it will be apparent that the tension reduces at a constantly decreasing rate as the speed of the line increases.

There has therefore been described a tension control system which will perform the desired results, which is simple, requiring no extensive relay or other type of operating equipment and which is extremely reliable and effective in its operation. It will be appreciated that changes therein will be apparent to those skilled in the art, all of which may be considered as within the spirit and scope of the invention, limited as it is only as defined in the appended claims.

What is claimed is:

1. A tension controller in a rewind system for uncoiling and coiling strip material comprising in combination with a rewinding reel and an unwinding reel a strip material engaging roller means disposed intermediate said reels, dynamoelectric machines connected to said reels and to each other in a loop circuit, dynamoelectric control means including a tachometer generator mechanically connected to said roller means and electrically connected to one of said dynamoelectric machines for controlling said dynamoelectric machines to establish a predetermined tension in the strip material being coiled, said control means controlling the voltage in the loop circuit to maintain said voltage directly proportional to the speed of the strip material being passed from the unwinding reel to the rewinding reel and including a further control means enabling a variable selection of the tension introduced into the strip material.

2. A tension controller in a rewind system as defined in claim 1, wherein one of said reel connected dynamoelectric machines comprises a motor and the other of said machines comprises a generator.

3. A tension controller in an unwind and rewind system for strip comprising in combination with an unwind reel and a rewind reel, a motor connected to said rewind reel, a generator connected to said unwind reel, said motor and said generator being connected to one another in an armature loop circuit, a dynamoelectric regulator energizing and controlling the field winding of said motor and responsive to a signal received from said armature loop circuit for maintaining the strength of the motor field flux substantially constant; a further dynamoelectric regulator energizing the field winding of said generator to control the potential developed by said generator in said armature loop circuit to impose a tensile load on a strip being fed from said unwind reel to said rewind reel, said last mentioned regulator regulating said developed potential in response to a plurality of comparative signals one of which is selectable to impress a desired degree of energization upon said generator field winding.

4. A tension controller in a rewind system for a process line comprising in combination with an unwind and rewind reel, a plurality of dynamoelectric means connected to each of reels and to each other in an armature loop circuit, means responsive to conditions in the line for controlling the voltage in said loop circuit wherein a tension is developed in a strip passing from the unwind to said rewind reels, said means comprising a voltage regulator acting to control the excitation of one of said dynamoelectric means, said regulator including a pair of control windings and means to energize said windings such that they oppose one another, said responsive means also comprising a pair of signals generators interconnected in opposing relation wherein as the potential developed by one of said generators overcomes the potential developed by the other, one of said windings is energized to reduce the excitation of said regulator.

5. A tension controller in a rewind system as defined in claim 4 including further means whereby the signals developed by said signal generators may be selectively varied to produce variable tension on a strip.

6. A tension controller in a rewind system as defined in claim 5 wherein said last mentioned means comprises a rheostat controlling the effectiveness of one of said control windings.

7. A tension controller in a rewind system for controlling tension in a strip being unwound and rewound comprising in combination with a rewind reel and an unwind reel, a feedback motor connected to said rewind reel, a drag generator connected to said unwind reel, said feedback motor and said drag generator being interconnected in an armature loop circuit, control means for maintaining a constant current in said loop circuit, further control means for regulating the voltage in said loop circuit, said last mentioned means including a dynamoelectric regulator controlling the excitation of said drag generator, said regulator including control windings of opposite polarity in bucking relation, and means including a pair of signal generators for exciting said windings in response to conditions of speed and tension acting on a strip.

8. A tension controller in a rewind system as defined in claim 7 wherein one of said signal generators develops a potential proportional to the speed of the rewind reel and the other of said generators develops a potential proportional to the speed of a strip between said reels, the generators being interconnected in a common circuit whereby one of said control windings is supplied with a variable potential proportional to the strip speed, and the other with a variable potential proportional to the difference in voltage between the said signal generators, the latter winding being excited only when a preselected portion of the potential developed by said last mentioned signal generator exceeds that developed by said first mentioned generator.

9. A tension controller in a rewind system as defined in claim 8 including further rheostat means in said common circuit whereby the excitation of one of said control windings may be selectively adjusted to produce desired conditions in a strip.

References Cited in the file of this patent

UNITED STATES PATENTS

| 2,306,157 | Edwards et al. | Dec. 22, 1942 |
| 2,509,286 | Blain | May 30, 1950 |
| 2,586,412 | Winchester | Feb. 19, 1952 |
| 2,665,401 | Pell | Jan. 5, 1954 |

UNITED STATES PATENT OFFICE
CERTIFICATE OF CORRECTION

Patent No. 2,975,991  March 21, 1961

Mathias Michel

It is hereby certified that error appears in the above numbered patent requiring correction and that the said Letters Patent should read as corrected below.

Column 7, line 22, after "of" insert -- said --; line 31, for "signals" read -- signal --.

Signed and sealed this 19th day of September 1961.

(SEAL)
Attest:

ERNEST W. SWIDER
Attesting Officer

DAVID L. LADD
Commissioner of Patents
USCOMM-DC